June 11, 1968

R. W. WISE 3,387,490

RHEOMETER DIE IMPROVEMENT

Filed Sept. 27, 1965

INVENTOR.
RALEIGH W. WISE
BY
Richard O. Zerbe
AGENT

INVENTOR
RALEIGH W. WISE

United States Patent Office 3,387,490
Patented June 11, 1968

1

3,387,490
RHEOMETER DIE IMPROVEMENT
Raleigh W. Wise, St. Albans, W. Va., assignor to Monsanto Company, St. Louis, Mo., a corporation of Delaware
Filed Sept. 27, 1965, Ser. No. 490,606
11 Claims. (Cl. 73—101)

ABSTRACT OF THE DISCLOSURE

The disclosure is an improved rheometer die for confining an elastomer sample under pressure. A continuous wall of the die deforms so that the die cavity expands and contracts. Pressure is thereby maintained in the die cavity during the elastomer curing period which makes it possible to obtain an accurate cure curve for the elastomer.

---

This invention relates to an improved metal die member of a rheometer die. Thet invention also relates to an improved method for measuring the curing characteristics of an elastomer sample.

An object of this invention is to provide a metal die member having elastic properties for a rheometer die. A further object of this invention is to provide an improved method for measuring the curing characteristics of an elastomer sample. A further object of this invention is to provide an improved method for measuring the complete curing characteristics of an elastomer sample. A further object of this invention is to provide a metal die member which eliminates distortion in the rheometer cure curve of an elastomer sample being cured within the cavity of a confining and curing die. A further object of the invention is to provide a metal rheometer die having elastic properties comprised of two die members. A further object of the invention is to provide a metal rheometer die having elastic properties comprised of two die members which eliminate slippage of an elastomer sample being cured within the cavity of the die while subjected to a shearing action by an oscillating rotor. A further object of the invention is to provide a metal die member equipped with a stud for controlling the maximum volume of a rheometer die cavity for confining and curing an elastomer sample. A further object of the invention is to provide a metal rheometer die having elastic properties comprised of two die members and equipped with a stud to control the maximum volume of the die. A further object of this invention is to provide a method for measuring the complete curing characteristics of an elastomer sample accurately in an oscillating disk rheometer whereby slippage of the sample being cured is eliminated. A further object of the invention is to eliminate slippage of an elastomer sample when the temperature of the sample in a rheometer die is decreased. Other objects of the invention will become apparent as the description proceeds.

2

Figure 4:
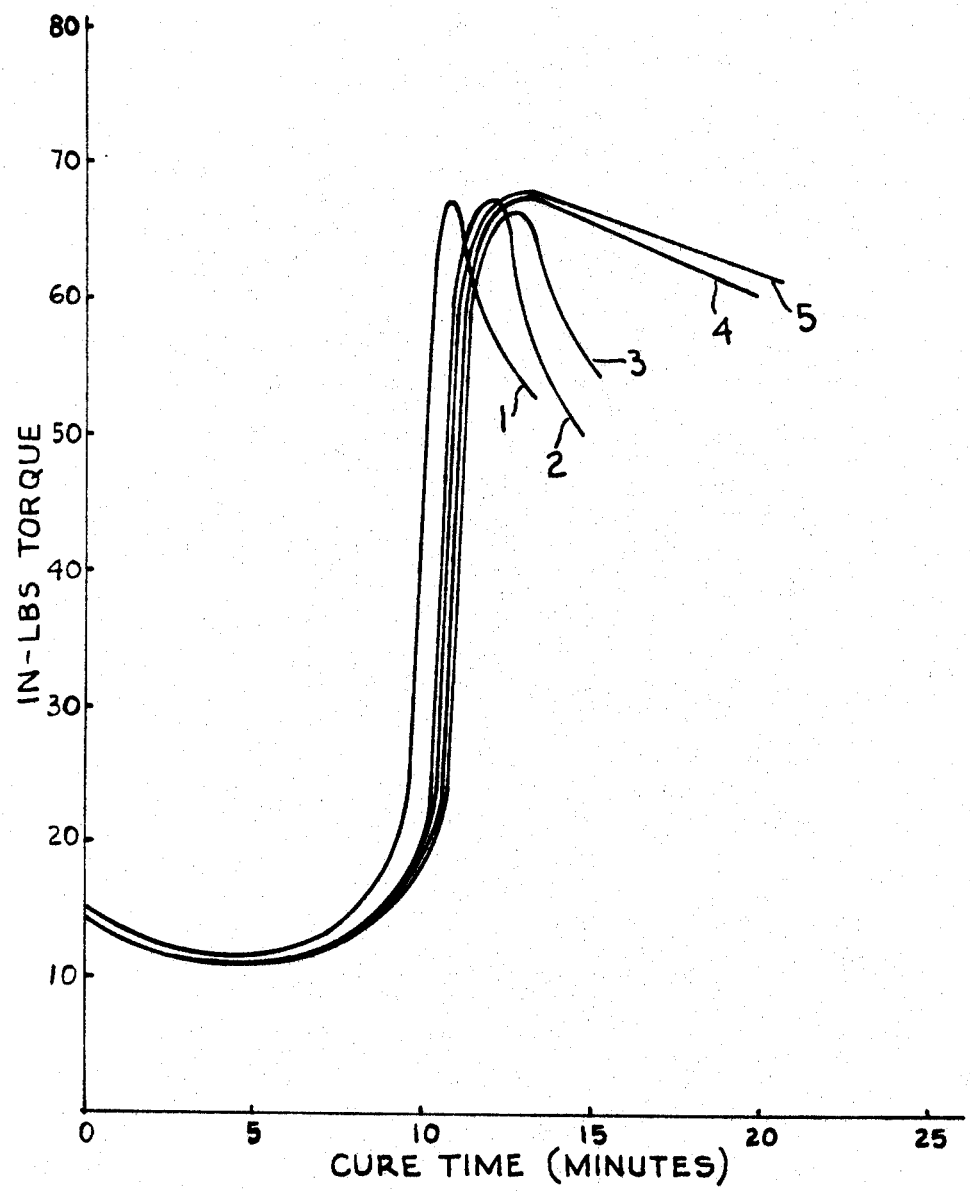

FIGURE 4 is a graph illustrating the effect on the cure curves of elastomer samples when a die member of the invention is used.

Figure 5:
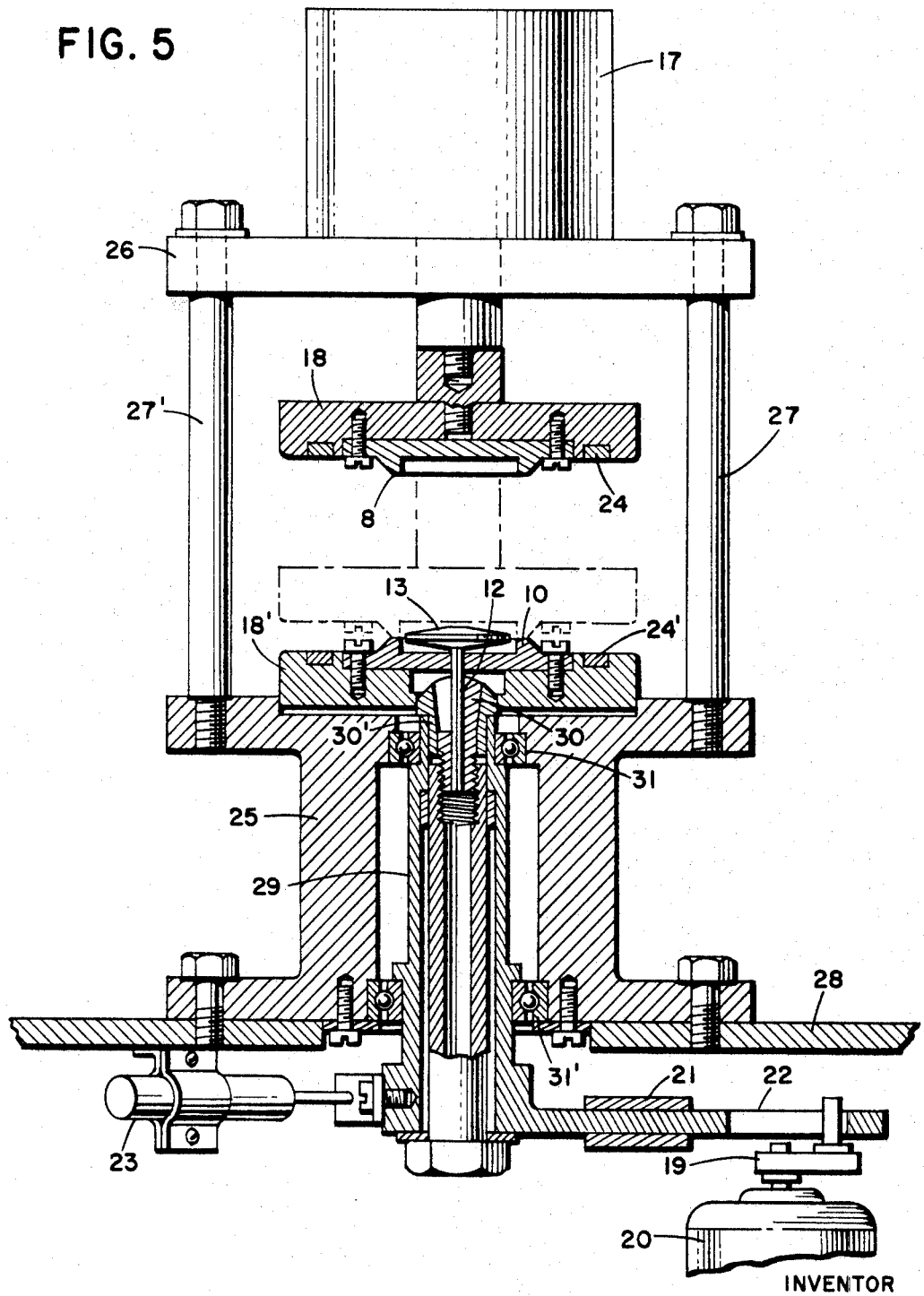

FIGURE 5 is a vertical cross-sectional view through the center of a rheometer.

A serious problem in obtaining a complete and accurate cure curve of an elastomer sample in the operation of a rheometer is a sudden decrease in the torque which causes a distortion in the rheometer cure curve. Curve 1 of FIGURE 4 illustrates the cure curve of an elastomer sample cured in a container which does not have elastic properties. The torque decreases so rapidly, it is impossible to determine the true curing characteristics of the sample. The decrease in torque appears to be caused by slippage of the elastomer sample within the container. The slippage that occurs during cure has been ascribed to shrinkage of the elastomer sample which is known to occur when the polymer is crosslinked. Slippage can also occur when the temperature of the sample in the rheometer is decreased. The shrinkage of the elastomer sample causes an accompanying drop in the initial pressure within the container cavity. The initial pressure is the pressure of the filled cavity prior to the test. The cavity pressure on a natural rubber sample in a curing container which does not have elastic properties drops from about 650 lbs./in.$^2$ to about 50 lbs./in.$^2$ in 25 minutes during cure. In contrast, the cavity pressure on a natural rubber sample, in a curing container with a die having elastic properties and using a maximum wall deflection of 0.02 inch, drops from about 650 lbs./in.$^2$ to only about 400 lbs./in.$^2$ in 25 minutes during cure. The extreme drop in pressure experienced in a die not having elastic properties causes the force, which presses the rubber against the rotor and die members of the container, to steadily decreases. When the force falls below a critical value, slippage apparently occurs and the rheometer cure curve is not accurate as illustrated by curve 1 of FIGURE 4.

Various inadequate methods of controlling the slippage of the elastomer samples in elastomer evaluation equipment are disclosed. Plungers held against springs are suggested by Mooney in U.S. Patent 2,037,529 (Cl. 265—11) (1936). The plungers are inadequate because they only furnish localized force. The plungers are also impractical because of inactivation of the plunger system caused by seepage of the sample during the test. Naylor in U.S. Patent 1,327,838 (1920) discloses weights placed on a shaft holding an upper gripping member to control the pressure on a test piece of rubber. The latter method is directed to an open system. I have tested an overlapping die in an attempt to control the elastomer sample slippage. The overlapping die is comprised of a piston in a cylinder as a means for cavity volume decrease. The overlapping die system prevents slippage but gives varying results which are dependent on the viscosity of the elastomer being tested. This effect is minimized by tapering the sides of the dies. Because of the close tolerances which must be maintained and the fragile nature of the overlapping die system, its use is limited to special applications, for example, ebonite. I have discovered a highly efficient means for maintaining the cavity pressure thereby controlling the slippage of an elastomer sample within a confining and curing apparatus. The sinew of this improvement is a die member of the rheometer apparatus having at least one wall which is elastic, viz, both expansible and resilient. The apparatus is comprised of two die members. Both or either die member can have elastic walls. An elastic wall in the upper die is preferred.

Figure 1:
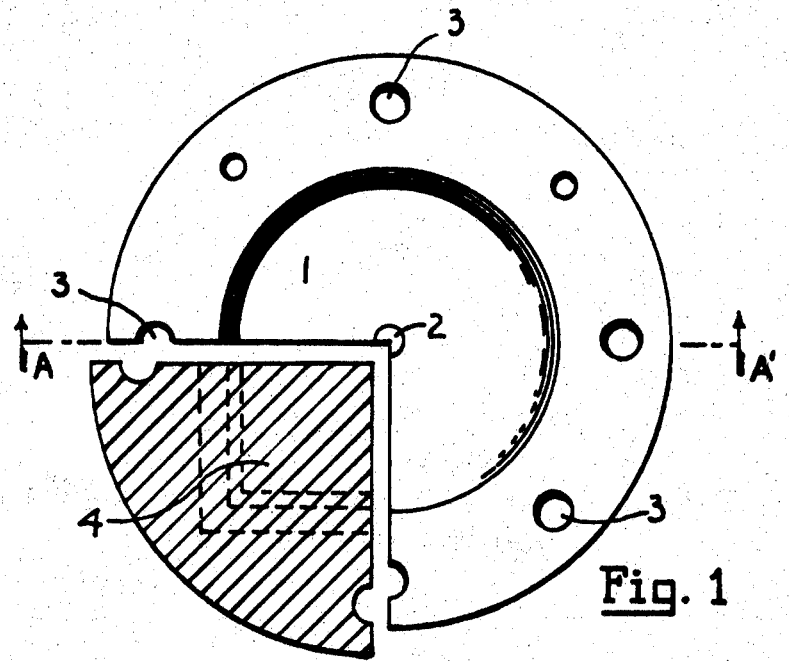
FIGURE 1 is a surface view of a section of the metal die member of the invention illustrating the elastic circular wall. The sliced quarter section of FIGURE 1 illustrates the square-shaped cavity below the circular wall by phantom lines.

FIGURE 1 is a surface view of the die section illustrating the elastic circular wall 1, a stud 2 for controlling the maximum volume of the die cavity, and holes 3 for screws. The elastic circular wall is above the square-shaped cavity 4 illustrated by the inside phantom lines of the sliced quarter section in FIGURE 1. The cavity 4 shape is not limited to a square. For example, the cavity 4 can be circular in shape. The die wall 1 is a thin metal material which is strong enough to safely confine an elastomer sample under pressure. The die wall 1 is also elastic. The metal of the die wall 1 is sufficiently elastic to expand when an elastomer sample is loaded under pressure and to contract if the elastomer shrinks during cure. For example, the material used for the die wall 1 can be American Institute of Steel and Iron Type A2 tool steel about 0.065 inch in thickness.

Figure 2:
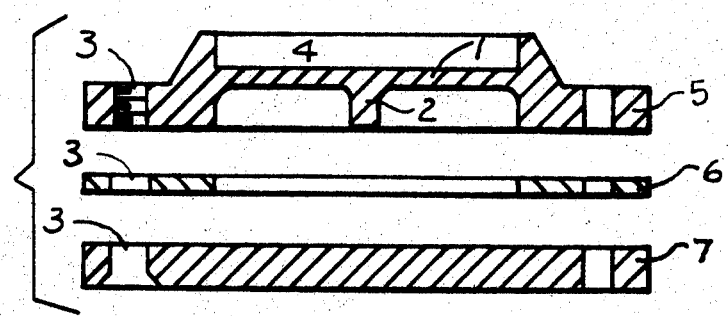
FIGURE 2 is a cross section of the dismantled metal die member of this invention showing most of the features of the invention. The FIGURE 2 cross section is taken through the center of the die as illustrated by the line A to A' in FIGURE 1.

FIGURE 2 illustrates a cross section of the dismantled die member of the metal apparatus for confining elastomer samples taken at line A to A' of FIGURE 1. In the die section 5, the elastic circular wall 1 is adjacent the cavity 4 for confining the elastomer sample. In the center of the wall 1 opposite the cavity 4 of the die section 5 is the stud 2. The stud 2 position is not limited to this illustration. For example, the stud 2 can be attached to the back-up plate 7. A shim 6 is preferably used between the die section 5 and the back-up plate 7 of the die member to alter the maximum volume. The holes 3 in the back-up plate 7, the shim 6, and the die section 5 are for receiving a long, flat-head screw as for example, an Allen screw, which assembles the two or three sections together securely to make up a die member of this invention.

Figure 3:
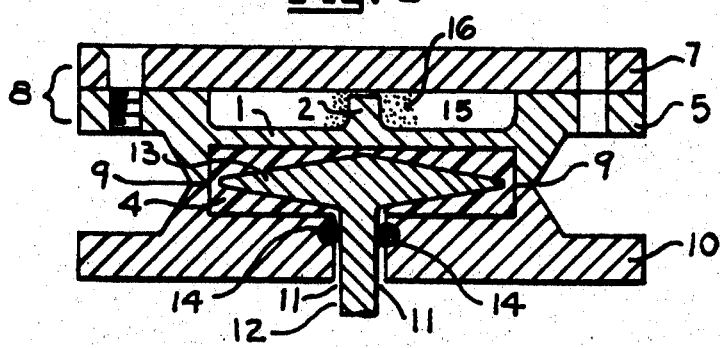
FIGURE 3 is a cross section of the metal die apparatus with an oscillating rotor in the test cavity. The FIGURE 3 cross section is taken through the center of the rheometer.

FIGURE 3 illustrates a cross section of the die apparatus with a rotor in the test cavity of the rheometer. The back-up plate 7 and the die section 5 comprise the upper die 8. The shim 6 of FIGURE 2 is not used in FIGURE 3. The upper die 8 illustrates the elastic wall 1 with the stud 2 not touching the back-up plate 7. The upper die assembly 8 is in contact at 9 with the lower die 10. The lower die 10 has an opening 11 in the center to allow passage of the shaft 12 of the rotor 13 into the die cavity 4. O-rings 14 are in the lower die 10 at the mouth of the die cavity 4 for sealing purposes. The elastomer sample is illustrated in the die cavity 4. A material 16 can be placed in the space 15 of the upper die 8 for heat transfer from the back-up plate 7 to the cavity 4. For example, a copper spring can be placed in the space 15 for use as a heat transfer agent. Grooves in the wall or walls of the cavity 4 not illustrated aid in holding the elastomer sample stationary. The grooves may be, for example, serrated radial grooves, small notches or indentions, or other small depressions in the cavity wall or walls.

FIGURE 4 illustrates the effectiveness of the elastic die member of this invention in preventing slippage of a curing rubber sample. The curves in FIGURE 4 are obtained using a rheometer substantially as described in the co-pending application of George E. Decker, Serial No. 231,428, filed October 18, 1962. The rheometer used for the illustrations comprises a forced oscillator embedded in an elastomer specimen under pressure in a metal die apparatus substantially as illustrated in FIGURE 3. The oscillator moves horizontally through a small arc while the specimen is heated and maintained under pressure, thereby subjecting the specimen to the shearing action of the oscillator. The torque required to apply the shearing stress is measured by a stress transducer. A graphic plot of the torque vs. cure time illustrates the scorch time, curing rate, time to optimum cure, and change in dynamic properties of the specimen. The apparent slippage of the curing rubber sample is continually reduced as a wall of the die is allowed to deflect greater amounts as FIGURE 4 illustrates. The data for FIGURE 4 are obtained in a die with a square test cavity approximately two inches wide comprised of two dies each 0.2 inch in depth making the total cavity depth 0.4 inch. Except for curve 1, each die has an upper die member with a two inch diameter elastic wall about 0.065 inch thick. Curve 1 illustrates an elastomer sample cured in an apparatus with no elastic wall. Curve 2 illustrates an elastomer sample cured in the same type apparatus but with an elastic wall and with a maximum wall deflection of 0.00 inch at the center of the die member. Even with no deflection at the center of the die member, curve 2 illustrates an improved method over that used for curve 1. The improvement shown in curve 2 is due to the resilience of the die wall at places other than its center. Curve 3 illustrates an elastomer sample cured in the apparatus with an elastic wall and with a maximum wall deflection of 0.010 inch at the center of the die member. Curve 4 illustrates an elastomer sample cured in the apparatus with an elastic wall and with a maximum wall deflection of 0.017 inch at the center of the die member. Curve 5 illustrates elastomer samples cured in the apparatus with an elastic wall and with maximum wall deflections of 0.020 and 0.030 inch, respectively, at the center of the die member. A deflection of about 0.030 inch does not alter the shape of the 0.020 inch cure curve. A deflection of about 0.020 inch is preferred. Tensile modulus measurements on individual specimens cured to various times confirm that no slippage is occurring at a deflection of 0.020 inch. Therefore, the descending portion of the cure curve obtained with the elastic die member of this invention indicates true reversion and not slippage. The improvement of this invention provides instruments such as the rheometer used for the illustrations of FIGURE 4 with a means for determining the complete and accurate curing characteristics of an elastomer specimen.

FIGURE 5 is a vertical cross-sectional view through the center of the rheometer, supra, which illustrates the closure means. The cavity may be opened for insertion and for removal of the test specimen but is held closed during the test by air cylinder 17. A sinusoidal oscillating rotor 13 oscillates through a small angle. The upper and lower dies 8 and 10 form the test chamber and are mounted on platens 18 and 18'. Oscillating motion may be imparted by an eccentric 19 driven by motor 20. Torque is sensed by stress transducer 21 comprising strain gauges bonded to the lever 22. Displacement of the rotor is measured by the differential transformer 23. The metal platens contain circular heat elements 24 and 24'. The lower metal platen rests on housing element 25 held in fixed relation to cylinder adapter plate 26 by supporting rods 27 and 27'. The housing in turn rests on the base plate 28. The shaft 29 contains the collet and draw bar assembly 30 and 30'. The rotor is securely fastened to the shaft by the collet and draw bar assembly. The shaft of the rotor 12 and the collet opening are preferably square to aid in eliminating slipping and play in the oscillating cycle. Friction of the shaft during oscillation is reduced by ball bearings 31 and 31'.

It is intended to cover all changes and modifications of the examples of the invention herein chosen for purposes of disclosure which do not constitute departures from the spirit and scope of the invention.

What is claimed is:

1. In an elastomer testing instrument comprising a die apparatus having a cavity in which an elastomer sample is confined under pressure, an improved metal die member comprising
    a continuous wall adjacent to the cavity at least a part of which is deformable material of the proper strength and elasticity to expand the cavity under sample-loading pressure and to contract after sample loading, and
    an adjoining wall adjacent to the cavity of material which is substantially non-deformable and which defines a cavity mouth substantially conterminous with the continuous wall.

2. A metal die member according to claim 1 wherein at least one wall is lined with grooves.

3. A metal die apparatus having a cavity for confining an elastomer sample under pressure comprising
    a die member having
        a continuous wall adjacent to the cavity at least a part of which is deformable material of the proper strength and elasticity to expand the die cavity under sample loading pressure and to contract the die cavity after sample loading and an adjoining wall adjacent to the cavity of material which is substantially non-deformable, and a cooperating die member which is substantially non-deformable and taken together the die members enclose the die cavity.

4. A metal die apparatus having a cavity for confining an elastomer sample under pressure comprising
a die member having
a continuous wall adjacent to the cavity at least a part of which is deformable material of the proper strength and elasticity to expand the die cavity under sample loading pressure and to contract the die cavity after sample loading and
an adjoining wall adjacent to the cavity of material which is substantially non-deformable, and
a substantially identical cooperating die member and taken together the die members enclose the die cavity.

5. Apparatus according to claim 3 wherein at least a part of each die is lined with grooves.

6. Apparatus according to claim 3 comprising means for limiting the deformation of the deformable part of the die wall and means for curing the elastomer sample.

7. A metal die apparatus having a cavity for confining an elastomer sample under pressure comprising
an upper die having a continuous top adjacent to the cavity wherein at least a part of the top is deformable material of the proper strength and elasticity to expand the die cavity under sample loading pressure and to contract the die cavity after sample loading and having in the deformable part
a stud for limiting the increase in volume of the die cavity,
a metal back-up plate separated from the stud by a pre-determined distance to control maximum expansion of the die cavity,
a lower die of material which is substantially non-deformable,
means for heating the elastomer sample, and
means for measuring the viscosity of the elastomer sample during heating.

8. Apparatus according to claim 7 in which the die cavity is substantially rectangular in shape.

9. Apparatus according to claim 7, including the following additional elements: means for heat transfer from the back-up plate of the upper die to the elastomer sample and means for holding the apparatus closed.

10. A metal die apparatus having a cavity for confining an elastomer sample under pressure comprising
a die member having
a continuous wall adjacent to the cavity at least a part of which is deformable material of the proper strength and elasticity to expand the die cavity under sample loading pressure and to contract the die cavity during sample shrinkage and having in the deformable part
a stud for limiting the increase in volume of the die cavity,
a metal back-up plate separated from the stud by a predetermined distance to control maximum expansion of the die cavity,
a cooperating die member of material which is substantially non-deformable,
means for heating the elastomer sample, and
means for measuring the viscosity of the elastomer sample during heating.

11. Apparatus according to claim 10, including the following additional elements: means for heat transfer from the back-up plate to the elastomer and means for holding the apparatus closed.

References Cited
UNITED STATES PATENTS 2,037,529   4/1936   Mooney _____ 73—101

FOREIGN PATENTS 466,663   6/1937   Great Britain.

JAMES J. GILL, *Primary Examiner.*

RICHARD C. QUEISSER, *Examiner.*

J. H. WILLIAMSON, *Assistant Examiner.*